Patented Aug. 2, 1938

2,125,391

UNITED STATES PATENT OFFICE 2,125,391

SALAD DRESSING

Albert Musher, New York, N. Y., assignor to Musher Corporation, Elizabeth, N. J., a corporation of New Jersey No Drawing. Application May 20, 1937, Serial No. 143,849

4 Claims. (Cl. 99—144)

This invention relates to salad dressings, and more particularly to salad dressings having a dual function being of firm butter-like body and texture at cooler temperatures, such as refrigerator temperature, while at room temperatures the dressing is of softer, or mayonnaise consistency.

Salad dressings of the mayonnaise type as heretofore available on the market are of relatively soft consistency and are generally packaged in bottles, jars or similar types of containers. They are too soft for packaging in print form like butter. Another disadvantage lies in the fact that such soft types of materials tend to soak into bread and other food materials of absorbent character, making such bread soft or soggy. Such mayonnaises do not have "spreadability" in the sense of butter, which is an excellent "spread" for bread, etc., so that the mayonnaises tend to be used in unnecessarily large quantities.

On the other hand, hard fats, even when fluxed with oil, while possessing "spread" and greater firmness, do not readily admix with water, oil or other media frequently used for thinning purposes; and moreover such harder fats do not readily melt at body temperatures, so that they give a hard "fatty" taste which is undesirable.

Among the objects of the present invention is the production of salad dressings possessing "spread" and firm body (butter-like) texture at lower (refrigerator) temperatures, while possessing softer, mayonnaise consistency at room temperature, and readily miscible with thinning media to produce thinner salad dressings, or dressings of modified flavor and taste.

Other objects include componets utilizable in producing salad dressings of the type described, as well as methods of producing and packaging such salad dressings and components.

Still further objects and advantages will appear from the more detailed description given below, it being understood, however, that such detailed description is given by way of illustration and explanation only, since various changes therein may be made by those skilled in the art, without departing from the scope of the present invention.

In accordance with the present invention, salad dressings are prepared from compositions produced with relatively hard or solid fats (as compared in consistency with salad oils) incorporated with oil-in-water emulsions, the proportions of the compositions being such as to yield relatively firm-bodied (butter-like) materials at refrigerator temperatures, but of relatively soft (mayonnaise) consistency at room temperature. Desirably in producing such compositions, the hard or solid fats are first fluxed or softened by thorough intermixture with oils, and such compositions are then admixed with the oil-in-water emulsions.

As exemplary of fats and oils that can be used in making a firm bodied material, there may be mentioned olive oil, cottonseed oil, corn oil, cocoanut oil, peanut oil, oleo oil, oleo stock, oleostearin, neutral lard, and hydrogenated or partially hydrogenated oils, and other oils and fats particularly of vegetable or animal derivation. These various materials are chosen or blended together in proportions to give a relatively firm bodied material as, for example, of butter-like consistency. Thus an oil may be partially hydrogenated until it possesses the desired body, or solid fats may be blended with liquid oils to give the texture desired. As a general rule, the melting point of the compositions thus produced will be from 80 to 120° F., variations being permitted in this portion of the composition, which may be referred to as the "solid" oil phase of the ultimate dressing, dependent on the proportions in which it is to be admixed with the oil-in-water emulsion, on the climate in which the salad dressing is to be used, etc. This so-called "solid" oil phase of the dressing may be incorporated with condiments, such as vinegar, lemon juice, salt, pepper, mustard, sugar, etc., in the usual proportions, as well as with emulsifying agents, eggs or egg yolks, etc.

The various ingredients of this "solid" oil phase material may be admixed or incorporated together as desired. Thus the selected solid fats and oils may be heated sufficiently to melt the fats and the oils mixed in, and the condiments, emulsifying agents or other additions then incorporated; or the solid fats without melting may be blended with the oils, etc.

It will be noted that this "solid" oil phase component may be substantially free from water or when aqueous materials like vinegar, egg yolk, etc. are added thereto, may contain substantial amounts of water. But this phase of the salad dressing composition is not of an oil-in-water type emulsion, but any water present would be distributed throughout the oil and fat composition.

This solid phase component as produced above and desirably having a melting point as indicated is relatively firm bodied, and retains such texture at body temperatures. For present purposes, therefore, it is incorporated with an oil-in-water emulsion.

The oil-in-water emulsion is desirably an aqueous emulsion of a liquid oil, which liquid oil may be of any desired type such as vegetable, animal or mineral. For example, olive oil, cottonseed oil, soya bean oil, mineral oil, or any of the other liquid oils mentioned above, may be used; most desirably the salad oils are used. The emulsions may be made in any desired way using, for example, from 15 or 20 per cent of oil up to, for example 85 per cent oil in the composition, together with the usual emulsifying agents, such as egg yolk, gums like gum tragacanth, etc. Condiments and other additions, as given above, may be made to the oil-in-water emulsion at any stage of their manufacture, so that such condiments or additions may be made either to the unemulsified solid oil components, or to the oil-in-water emulsion, or to both. The oil-in-water emulsions containing the higher oil contents as from 35 to 85 per cent are preferred for this phase of the product, and with the higher oil contents, and when containing condiments, etc. will be similar to mayonnaise in character and consistency.

The "solid" oil component is then admixed with the oil-in-water emulsion in any reasonable proportions to yield the final salad dressing of dual characteristics. For example, 65 per cent of a solid component prepared as set forth above is incorporated with 35 per cent of the oil-in-water emulsion prepared as set forth above. The mixing is readily accomplished in any usual type of mixing apparatus.

The above methods and manipulations produce the most desirable products in accordance with the present invention. While the solid fats may be converted into oil-in-water type emulsions or oil-fluxed solid fats may be similarly emulsified, or the oil-in-water emulsions described above may be incorporated into the solid oil component at any stage of manufacture of the latter, the indicated procedures give the most desirable products.

The preferred products of the present invention have a wide variety of important characteristics of which the following may be noted particularly.

The salad dressing is of firm butter-like body and texture when kept in cooler temperatures such as refrigerator ice box temperature. When removed from the icebox and allowed to stand at room temperature for a short time, it becomes automatically a mayonnaise or salad dressing of the usual soft type that is sold commercially today for use in salads, etc.

Because of the fact that there is incorporated into the solid oil component, an oil-in-water emulsion, this improved salad dressing is much more easily handled by the consumer, because she can beat it down quicker and more easily, because she can use it for decorating and moulding much better, etc., all of this because of its more "pliable" nature as created by the use of the oil-in-water emulsion in conjunction with the solid oil component.

Because of the fact that an oil-in-water emulsion such as ordinary mayonnaise or salad dressing absorbs water and similar moisture liquids into its continuous phase much more easily than does solid salad dressing, the fact is that this new salad dressing is enabled to take in water and similar liquids much more easily and efficiently than is done by solid salad dressing. This advantage is not just one of permitting the addition of water and similar liquids to the solid salad dressing to get a thin flowing type of salad dressing or mayonnaise, but it has as one of its further main advantages the fact that it lends itself for use in salads and sandwiches much more readily than does the old type solid salad dressing. The reason for this is that in the making of a salad as, for example, a lettuce and tomato salad, a solid salad dressing of relatively high melting point has the tendency to fall off the lettuce or tomato because it does not mix so well with the water surface of the lettuce and tomato due to its non-fully emulsified oil at its surfaces. However, in the case of this new improved salad dessing, the dressing acts very much the same as does ordinary mayonnaise or salad dressing when used in conjunction with salads because of its increased facility of mixing with the water and moisture elements of the salad etc., in view of the fact that there is present an oil-in-water emulsion to pick up and intermix with the moisture and water of the salad. Also because of this feature the salad dressing may be more readily mixed by the consumer with much less fear of separation, with water, cream, and moisture containing products, such as chili sauce, etc.

There is a large use for solid salad dressing in conjunction with "spreading" for sandwiches, etc., but there is the much wider use today for salad dressing in conjunction with salads and similar foods where the salad dressing is to be mixd in. It is for foods such as this that there is required a product that may be packaged in pasteboard cartons for economy; a product that may be used for spreading purposes if required; but at the same time there is required a product that will simply and efficiently take on a soft mayonnaise or salad dressing form as found in ordinary mayonnaise and salad dressing that may be used in salads and foods where efficient mixing and the other advantages of a softer type of dressing are necessary. The present invention supplies such products.

Another advantage of this improved salad dressing is that although, at room temperature, it has the full general consistency and "pliability" as found in ordinary mayonnaise or salad dressing, nevertheless it can be manufactured so that even with these advantages it will have at room temperature even more body than ordinary mayonnaise or ordinary salad dressing, and still be fully pliable. This is of distinct advantage for the consumer who wants to make a salad which will "stand up", and this particularly applies to the delicatessen trade where in the making of their salads, such as potato salad, chicken salad, etc., they do not want these salads to "fall down" inasmuch as it is of particular advantage to them to have a mayonnaise that will "stand up" better.

Although this salad dressing may be brought down to the same general consistency as regular mayonnaise, it has another advantage to the consumer over regular mayonnaise, and that is that the consumer does not have to use as much of this product as she does of regular mayonnaise in order to get the same result. This is due to the fact that ordinary mayonnaise made entirely with liquid oils is absorbed much more easily and readily into the fiber and structure of the foods in which it is mixed because its ingredients are liquid to a very large extent. Solid salad dressing because of the fact that it contains some solid fat is not absorbed so readily into the structure of the food with which it is mixed and it, therefore, produces a less soggy salad. For example, in potato salad, etc. there is not required the use of so much dressing on the potato salad to get satisfactory results. This fact is important because salad dressing is used in salads such as potato salad not only to give flavor, but also to counteract the dryness to the taste, to give body to the salad, etc., and this is accomplished with less of the novel salad dressing than with ordinary mayonnaise, because this novel salad dressing is not absorbed so easily by the foods with which it is mixed and still it gives the foods body, counteracts dryness, etc.

This improved salad dressing is more "pliable" possibly due to the fact that the oil-in-water emulsion gets in between the particles of the solid fat in the solid salad dressing and in this way has more or less of a "roller bearing" effect which gives it greater pliability and efficiency in handling.

That this novel salad dressing is able to go from its solid form at cooler temperature to the soft mayonnaise form at room temperature, may be due to the fact that as the hard fat in the product melts, the oil-in-water emulsion in the product immediately "comes into play" and holds up the emulsion form of the entire product with the additional help that it gets from the hardened oil in the product to give it body.

When this improved solid salad dressing is allowed to stand at room temperature to attain ordinary mayonnaise or salad dressing consistency for salad use, it may then be replaced into the ice box to attain its solid form for sandwich and spreading use.

A further important advantage of this improved salid dressing is that it can be made to taste like ordinary mayonnaise or salad dressing. In the new improved salad dressing, because of the fact that a true emulsion is mixed in with the solid oil component, the new product carries a flavor of ordinary mayonnaise and salad dressing.

In the new improved salad dressing, it will be found that this oil-in-water emulsion is so well mixed with and dispersed throughout the solid salad dressing that it conceivably surrounds to a very good part the hardened or solid fat particles. Because of this, when one puts this new improved salad dressing into the mouth one gets the flavor of ordinary mayonnaise or salad dressing first. This is the agreeable mayonnaise flavor, and this is the mayonnaise or salad dressing flavor that the consumers have been used to getting.

Compositions of the character set forth herein lend themselves to novel packaging methods. The nature of these salad dressings is such, as pointed out above, that when in refrigerated or cooled condition they possess the texture or body of butter-like materials, and consequently they may be printed and packaged in the same way that butter is handled. Or at higher temperatures where their consistency becomes that of mayonnaise, they may be handled by being packaged directly in the carton in which they are to be sold, and thus may be deposited in situ in a carton or similar type of container, either lined or unlined, in which event the material deposited in situ assumes the shape of the container in which the deposition of salad dressing has taken place. These features enable the salad dressings in the present invention to be handled much like dairy products of the character of butter, or due to their dual character in the way that thinner types of salad dressings are employed.

Not only may the products of the present invention be packaged in cartons as set forth above, but they can be packaged in parchment paper the same as is done now with butter products without any necessity of using cartons. In such cases the usual routine for packaging the salad dressing base or salad dressing materials may be followed, the material desirably being at a cooler temperature or at least at a temperature that will keep it in substantially solid form so that the material can be printed or otherwise converted into the desired block form and such prints or blocks wrapped in the paper such as parchment in the usual way. So that these various packaging methods may be employed utilizing packaging either in parchment paper alone, or directly in cartons, or in paper and cartons.

Further advantages of the improved salad dressings of the present invention is their possession of much better texture and body than old types of salad dressings. The products of the present invention although substantially solid in character and at least solid enough to be handled like butter, etc. particularly at cooler temperatures, preserves smoothness in texture which is obtainable in the prior art only with mayonnaise or relatively thin salad dressings and not in more solid materials.

Having thus set forth my invention, I claim:

1. A salad dressing base comprising an edible oil-in-water emulsion carrying solid edible fat intimately incorporated therewith, the proportions of the ingredients being such as to give a composition of butter-like consistency at cool temperatures but of mayonnaise consistency at room temperatures.

2. A salad dressing base comprising an edible oil-in-water emulsion carrying a solid edible fat and oil composition intimately incorporated therewith, the proportions of the ingredients being such as to give a composition of butter-like consistency at cool temperatures but of mayonnaise consistency at room temperature.

3. A salad dressing comprising about 35 per cent of an aqueous emulsion of an edible liquid oil containing from 35 to 85 per cent of oil, intimately incorporated with 65 per cent of a solid edible fat and oil composition, and condiments, whereby a composition of butter-like consistency at cool temperatures and of mayonnaise consistency at room temperatures is obtained.

4. The method which comprises admixing an edible oil-in-water emulsion with a solid edible fat, the proportions of the ingredients being such as to give a composition of butter-like consistency at cool temperatures but of mayonnaise consistency at room temperature.

ALBERT MUSHER.